United States Patent [19]
Sridhar et al.

[11] Patent Number: 5,336,937
[45] Date of Patent: Aug. 9, 1994

[54] PROGRAMMABLE ANALOG SYNAPSE AND NEURAL NETWORKS INCORPORATING SAME

[75] Inventors: Ramalingam Sridhar, East Amherst; Seokjin Kim, Amherst; Yong-Chul Shin, Amherst; Naidu C. R. Bogineni, Amherst, all of N.Y.

[73] Assignee: State University of New York, Buffalo, N.Y.

[21] Appl. No.: 937,804

[22] Filed: Aug. 28, 1992

[51] Int. Cl.$^5$ ................. H03K 19/20; H03K 19/0944
[52] U.S. Cl. ..................................... 307/201; 307/450
[58] Field of Search ................. 307/201, 450; 365/185

[56] References Cited
U.S. PATENT DOCUMENTS

| | | | |
|---|---|---|---|
| 4,122,983 | 6/1992 | Massengill | 307/201 |
| 4,596,938 | 6/1986 | Cartwright, Jr. | 307/450 |
| 4,924,119 | 5/1990 | Lee | 307/450 |
| 4,950,917 | 8/1990 | Holler et al. | 307/201 |
| 4,956,564 | 9/1990 | Holler et al. | 307/201 |
| 4,978,873 | 12/1990 | Shoemaker | 307/201 |
| 4,999,525 | 3/1991 | Park et al. | 307/201 |

OTHER PUBLICATIONS

Lee et al, IEEE Trans. Cir. & Sys, 38, 6, 664 (Jun. 1991).
Kramer et al, 1990 Neural Info. Proc. Sys. Conf Proc. (Nov. 1990).
Borgstrom et al, IEE Proc., 137, Pt. G, No. 2 (Apr. 1990).
Lenzlinger et al, J. Appl. Phys., 40, No. 1 (Jan. 1992).

Primary Examiner—Edward P. Westin
Assistant Examiner—Benjamin D. Driscoll
Attorney, Agent, or Firm—M. Lukacher

[57] ABSTRACT

An analog synapse circuit for an artificial neural network requiring less circuitry and interconnections than prior synapses, while affording better weight programming means uses two complementary floating-gate MOSFETs with tunneling injection in an inverter configuration, with each MOSFET storing a weight value. This weight value is set by storing a charge injected by Fowler-Nordheim tunneling, or other tunneling means, into the floating-gate, which shifts the threshold voltage of the device. A programming line applies a current pulse to the MOSFET floating gate to write or erase this stored charge, thereby adjusting the weight of the MOSFET. The two MOSFETs are connected with the gate electrodes connected together and the drain electrodes connected together to provide a common gate and common drain between the two MOSFETs. An input line is connected to the common gate, and an output line is connected to the common drain. The source electrodes of each MOSFET are connected to reference voltages. The synapse circuit may be used in either a feedforword or feedback network, and may be expanded from two to four quadrant operation. The synapse provides a single output current line which represents a function of the input voltage and the stored weights. A plurality of such synapses may be configured in a network, wherein the output lines of each synapse are connected at a current summing node at the input of a neuron. An active load in the input of the neuron allows for both excitatory and inhibitory output current from the synapse circuit.

11 Claims, 8 Drawing Sheets

Table 1: Example 1. Synapse operation with fixed input, varing threshold voltage

| Input(V) | $V_{thp}$ | $V_{thn}$ | $I_d$ | $I_{dp}$ | $I_{dn}$ |
|---|---|---|---|---|---|
| 1.0 | -2.0 | 2.0 | 2.124155e-05 | 2.124156e-05 | 4.940521e-12 |
| 1.0 | -1.5 | 1.5 | 3.902647e-05 | 3.902650e-05 | 3.473025e-11 |
| 1.0 | -1.0 | 1.0 | 6.169571e-05 | 6.169629e-05 | 5.875540e-10 |
| 1.0 | -0.5 | 0.5 | 8.905178e-05 | 8.906262e-05 | 1.084749e-08 |
| 1.0 | 0.0 | 0.0 | 1.207593e-04 | 1.209605e-04 | 2.012713e-07 |
| 1.0 | 0.5 | -0.5 | 1.488361e-04 | 1.528062e-04 | 3.970085e-06 |
| 1.0 | 1.0 | -1.0 | 1.692114e-04 | 1.831438e-04 | 1.393241e-05 |
| 1.0 | 1.5 | -1.5 | 1.823340e-04 | 2.125361e-04 | 3.020216e-05 |
| 1.0 | 2.0 | -2.0 | 1.882598e-04 | 2.411597e-04 | 5.289988e-05 |

Table 2: Example 2. Synapse operation with fixed weight, varing input voltage

| Input(V) | $V_{thp}$ | $V_{thn}$ | $I_d$ | $I_{dp}$ | $I_{dn}$ |
|---|---|---|---|---|---|
| 0.0 | -1.0 | 1.0 | 1.209603e-04 | 1.209603e-04 | 4.960843e-12 |
| 0.5 | -1.0 | 1.0 | 8.906259e-05 | 8.906263e-05 | 3.474936e-11 |
| 1.0 | -1.0 | 1.0 | 6.169571e-05 | 6.169629e-05 | 5.875540e-10 |
| 1.5 | -1.0 | 1.0 | 3.901567e-05 | 3.902652e-05 | 1.084479e-08 |
| 2.0 | -1.0 | 1.0 | 2.104047e-05 | 2.124160e-05 | 2.011316e-07 |
| 2.5 | -1.0 | 1.0 | 4.608655e-06 | 8.575219e-06 | 3.966564e-06 |
| 3.0 | -1.0 | 1.0 | -1.254232e-05 | 1.375886e-06 | 1.391821e-05 |
| 3.5 | -1.0 | 1.0 | -3.016633e-05 | 1.148937e-09 | 3.016748e-05 |
| 4.0 | -1.0 | 1.0 | -5.283237e-05 | 4.223878e-12 | 5.283238e-05 |
| 4.5 | -1.0 | 1.0 | -7.943651e-05 | 3.708795e-12 | 7.943651e-05 |
| 5.0 | -1.0 | 1.0 | -1.086052e-04 | 3.714230e-12 | 1.086052e-04 |

FIG. 8

PROGRAMMABLE ANALOG SYNAPSE AND NEURAL NETWORKS INCORPORATING SAME

FIELD OF THE INVENTION

The present invention relates to artificial neural networks, and more particularly to an improved analog synapse in which two complementary floating gate MOSFETs have programmable weight control.

BACKGROUND OF THE INVENTION

The purpose of an artificial neural network is to imitate the functioning of a biological nerve system. Research in neural networks is focused on developing a system with a high degree of parallel processing capability to more efficiently solve complex problems as compared to normal computer systems. The speed and robustness of neural networks makes them attractive for applications such as pattern and speech recognition.

A network is usually characterized by simple functional units, each consisting of a neuron and a synapse or synaptic cell. Each synaptic cell provides storage of either a fixed or adjustable synaptic weight, and has an output which is a function of the input multiplied by that weight. The ability to change this weight or strength of the synapse enables the network to handle incomplete or noisy date and adapt itself to the near-correct solutions.

A biological neuron is typically connected to several thousands of other neurons through the synapse cell which result in high degree of parallelism. Due to the massive connectivity, a large number of synapses and neurons are required in hardware implementation and in turn, area limitation becomes the most crucial factor in its implementation.

It is a feature of this invention to provide a synapse for neural networks which enables the number of required external input of output stages, and the number of interconnections within the neural network, to be minimized, thereby creating a dense neural network with optimum utilization of chip area. The invention therefore provides a synapse having a small architecture requiring internal interconnectivity optimal for artificial neural networks.

Often neural network applications require several bits of resolution in synaptic weight which needs excessive chip area in digital implementation. Analog implementation on the other hand requires much smaller synaptic cells for the same resolution as that of digital with less supporting circuitry and interconnections, and are thus more attractive by requiring less IC area than digital implementations.

Several analog implementations of a neural network synaptic cell have been developed. One approach is using fixed resistors to implement a given synaptic weight cell; however, a network of such cells is static, since it lacks the learning capacity provided by adjustable weight levels. Also standard manufacturing technology makes it difficult to achieve precise value of resistance for weights. A second approach is the use of conventional multiplication (multiplier) circuits to create a synapse. Such multiplier circuits require excessive chip area due to the large number of transistors. A third approach is the storage of the synaptic weight as a charge in one or two capacitors. However, capacitors require a relative large area to implement on an IC, and is volatile due to current leakages; thus, capacitors require periodic refreshing to maintain precise weight storage. A fourth approach uses both digital and analog hardware, by having a RAM cell for weight storage and an analog circuit for converting the weight into a current. This synaptic cell approach also requires extensive area usage due to the RAM cell, and additional circuitry for digital to analog weight conversion.

Other types of analog synapses have used floating gate MOSFETs which have the capability of non-volatile weight storage by storing a charge in the floating gate by tunneling injection, which subsequently shifts the threshold voltage level of the device. The floating gate technology is based on tunneling effect described in an article entitled Fowler-Nordheim Tunneling into Thermally Grown $SiO_2$, by M. Lenzinger and E. H. Snow, *Journal of Applied Physics*, Vol. 40 No. 1, January 1992. However synapses incorporating these devices each requires additional area for both circuitry and interconnections which the present invention avoids.

An analog synapse with such MOSFETs uses one floating gate MOSFET with four other FETs in a transconductance amplifier configuration (See the article entitled Analog Floating-Gate Synapses for General-Purpose VLSI Neural Computation, by Bang W. Lee, et al., IEEE *Transactions on Circuits and Systems*, Vol. 38 No. 6, June 1991). This synapse however requires that the output of a neuron be converted from a voltage to a current prior to being inputted into a synaptic cell, which is provided by the addition of a two transistor circuit. A programmable synapse based on two floating gate MOSFETs in a common-input differential-output configuration is described in an article by A. Krammer, et. al., entitled Compact EEPROM-based Weight Functions, 1990 Neural Information Processing System Conference Proceedings, Nov. 7, 1990. This differential output approach requires that the two output currents be summed by a current comparator external to the synaptic element to provide a single output current. A programmable synapse similar to that described by Krammer, but requiring an additional transistor to function is described in an article by Borgstrom, entitled Programmable Current-mode Neural Network for Implementation in Analogue MOS VLSI, IEE *Proceedings*, Vol. 137, Pt. G., No. 2, April 1990. Such circuitry which requires either an amplifier or differential output circuitry structure, mitigates against the optimal utilization of IC semiconductor area.

Holler et. al. discusses the use of this MOSFET technology in U.S. Pat. No. 4,956,564 issued Sept. 11, 1990 and entitled "Adaptive Synapse Cell Providing Both Excitatory and Inhibitory Connections in an Associative Network". The patent shows a two quadrant multiplying synapse which has two floating gate MOSFETs in a single input differential output configuration, and a four quadrant multiplying synapse which has four floating gate MOSFETs in an array in a differential output configuration with dual complementary input lines. Each synapse circuit requires two capacitors, one on each output line, that discharge when the MOSFET conducts a current. However, due to both the differential output circuit structure, and their dependency on capacitance to generate current on the output lines, neither synapse is optimal in interconnectivity and semiconductor area utilization.

U.S. Pat. No. 4,999,525 issued Mar. 12, 1991 to Park et. al. and entitled "Exclusive-Or Cell For Pattern Matching Employing Floating Gate Devices" shows four floating gate MOSFETs in an array configured along two voltage input lines, where one is the complement of the other, and two differential output current lines. Such a synapse cell does not have optimal architecture for IC implementation, specifically in the required number of interconnections due to both its transistor array and differential output structure.

Further both Holler and Park patents show a synapse with a differential output circuit requiring a current comparator for summing the two output currents, which is an additional circuit which is not required by the present invention. Thus, both patents show a four quadrant multiplier synapse using four floating gate MOSFETs which requires less than optimal IC configuration. It is a feature of the present invention to optimize interconnectivity and minimize the cell area, while providing four quadrant operation.

Therefore, the analog synaptic cells using floating-gate MOSFETs described in the above discussed literature and patents have several drawbacks including the extent of the semiconductor area required for an analog synapse in VLSI technology, in that the differential output requires two output lines and a separate current comparator to sum that differential output, or an amplifier structure using five or more transistors and an input voltage to current stage. The need for a current comparator results in the excessive area usage since there are two summing output leads for each synapse which need to be routed to a comparator circuit to generate a single output. This comparator circuit must be either a part of or prior to each neuron, and as stated in the Borgstrom article such a current comparator would require the addition of an eight transistor circuit stage. Even though the amplifier configuration for a synapse avoids a differential output and current comparator circuit, it achieves this at the expense of additional transistors, internal cell circuitry, and an input current to voltage converter stage at the output of each neuron, and as such, does not minimize the use of semiconductor area in a VLSI chip. It is a feature of the present invention to provide a synapse which has a single output line and does not need a current comparator circuit or additional transistors.

Synapses, in accordance with the Holler patent, require a capacitor on each output line. VLSI technology requires a relative large area to construct such capacitors, and are costly to create within precise capacitance tolerances. Therefore it is a feature of this invention to provide a synapse which does not need a capacitor on the output line, and still has a minimal number of required interconnections, while maintaining all the functions needed in a synapse.

A further drawback of most of the analog synapses, in the above discussed documents, is that they are limited to two quadrant multiplication. In other words, the output current of the synapse versus the input voltage is limited to the first and third quadrants. To most accurately represent a biological neural system, full four quadrant multiplication is needed to allow for all levels of inputs and outputs. Two quadrant multiplication alone limits the ability of the network to model a natural neural network that a four quadrant multiplying synapse would afford. Although Holler and Park patents show a four quadrant multiplier, their synapses require area for circuitry and interconnections that the present invention avoids. This is due to their four floating gate MOSFETs, array circuit structure, dual input and output lines, and the requirement of a current comparator to sum the differential output. Further, the patents fail to disclose possible implementation of four quadrant multiplication for an analog synapse. In addition, the need for a circuit comparator at the output requires that the output signals pass through additional active components which negatively affects circuit linearity. It is a feature of the present invention to provide a synapse which requires less area to implement than Holler or Park, while providing improved linear response over four quadrants.

SUMMARY OF THE INVENTION

It is an object of the invention to provide an improved synapse for use with neurons, and in perceptrons and other neural networks and systems, having one or more of the above discussed features.

It is another object of the present invention to provide an improved analog synapse with a circuit or architecture (geometry) that requires less chip area to implement than analog synapses which have heretofore been proposed by reducing the number of required interconnections and circuitry between the synapse and the neuron, while maintaining linearity of response, thereby facilitating implementation of complex neural networks on VLSI chips.

Another object of the invention is to provide an improved synapse having MOSFETs wherein separate programming lines to each MOSFET are provided for setting weight levels to improve programming precision.

A further object of the invention is to provide an improved analog synapse which when used with a neuron circuit is capable of both excitatory and inhibitory current modes without requiring complex circuitry which restricts, because of the semiconductor area required, VLSI implementation.

Also, an object of the invention is to provide an improved synapse which allows expansion of the synapse from two to four quadrant operation without requiring complex circuitry which restricts, because of the semiconductor area required, VLSI implementation.

Another object of the invention is to provide an improved synapse circuit having a single current output line from the synapse thereby avoiding the need for a current comparator circuit for providing an output to an associated neuron.

Briefly described, an improved programmable analog synapse or synaptic circuit in accordance with the invention uses two floating gate MOSFETs with tunneling injection, one of N-Type and the other P-Type, in an inverter structure. Each MOSFET has an associated weight value corresponding to a stored charge in its floating-gate, which causes a shift in its threshold voltage. This stored charge results from a charge injected into the MOSFET's floating gate by Fowler-Nordheim tunneling or other tunneling means. Weight value may be repeatedly adjusted by changing the amount of this stored charge and thereby the threshold voltage shift of the MOSFET. In operation, a change in the threshold voltage effects the effective gate voltage level and thus the amount of drain current a MOSFET will conduct. The synaptic circuit consists of the gates of the MOSFETs connected to a single voltage input line, and the drains of the MOSFETs connected to a single output line. In a first embodiment the source electrode of the P-type MOSFET is set to a positive voltage level, while the source electrode of the N-type MOSFET is set to ground. The synapse output is a function of the input voltage and the stored weight within the two MOSFETs. Output current is produced when either or both MOSFETs in the synapse change from one state to another state as caused by changes in the input voltage to the synapse.

In a network implementation, the single output line of several such synapse are connected together at a current summing node at the input to the neuron. An active load present in the neuron input allows for both inhibitory and excitatory output current, by providing either a current sink or source to the synapse output line.

The programming of the MOSFET weight is achieved by a separate programming line to the floating gate of each MOSFET. A programming pulse is sent along this programming line to cause the injection and storage of charge into the floating gate to generate the desired weight. Each MOSFET may be independently set to a weight value, i.e. stored charge, to produce a threshold voltage shift that provides the desired operation of the synapse. An analog switch is present on each programming line, and its ON/OFF state determines whether the programming pulse will reach a MOSFET. Each analog switch may be independently controlled from a point external of the synaptic circuit.

Another embodiment of the invention allows for expanding the synapse from two to four quadrant multiplication without requiring excessive chip area usage. This is achieved by setting the supply voltage operating the synapse, and the selection of the active load in the neuron input.

The foregoing and other features, objects, and advantages of the invention and presently preferred embodiments thereof will become more apparent from a reading of the following detailed description in connection with the accompanying drawings.

BRIEF DESCRIPTION OF THE DRAWINGS

FIG. 8 shows two examples of the operation of the synapse cell of FIG. 1.

DETAILED DESCRIPTION

Figure 1:
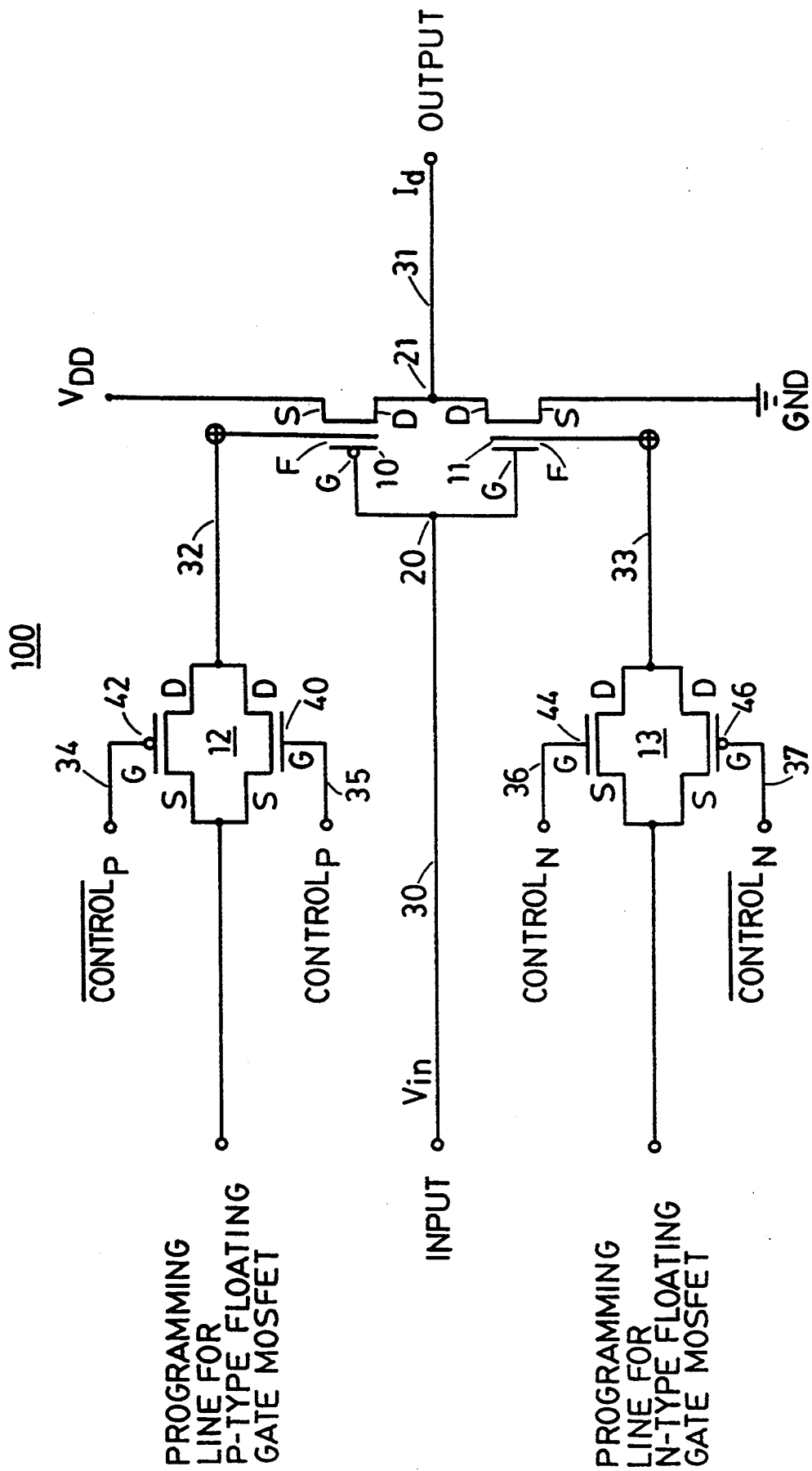
FIG. 1 is a schematic diagram of the circuitry of a neural analog synaptic cell in accordance with the invention.

Referring to FIG. 1 there is shown the circuit of an analog synaptic cell 100. The cell has two MOSFETs 10 and 11, MOSFET 10 is of P-type and MOSFET 11 is of N-type. These MOSFETs 10 and 11 are floating gate devices each having a programming node at their floating gate terminal which provides for tunneling injection. The gates G of the MOSFETs 10 and 11 are connected at node 20. Node 20 is connected to a voltage signal input line 30. The drains D of MOSFETs 10 and 11 are connected at node 21. Node 21 is connected to an output line 31. In the embodiment illustrated in FIG. 1, the source electrode of MOSFET 10 is referenced to an operating voltage $V_{DD}$, from a power supply, not shown. The source electrode of MOSFET 11 is connected and referenced to ground or common of the power supply. The MOSFETs 10 and 11 present weighted branches of the synapse. The weight stored in each MOSFET corresponds to the stored electrical charge in the floating gate, which is set during the programming of each MOSFET. Programming lines 32 and 33 are for programming the MOSFETs. Programming lines 32 and 33 are connected to the floating gate terminal F of their respective MOSFET which provide for injection of charge into the floating gate. The amount of this stored charge is directly proportional to the level of the threshold voltage shift in the MOSFET, as shown by Equation 1 below. In theory, this stored charge is injected by Fowler-Nordheim tunneling into the gate and effects the tunneling of the gate electrons. The amount of tunneling determines the level of threshold voltage at which the MOSFET conducts. Charge is stored in the floating gate of a device by the application of a program pulse on line 32 for programming P-type MOSFET 10, or on Line 33 for programming N-Type MOSFET 11. The amount of charge injected into the floating gate of either MOSFET is determined by the amplitude and duration of their respective programming pulse. The correspond threshold voltage shift, $\Delta V_{th}$, is governed by the equation:

$$\Delta V_{th} = \frac{\Delta Q}{C_f} \qquad (1)$$

where $\Delta Q$ is the injected charge due to Fowler-Nordheim tunnelling or other tunnelling during programming, and $C_f$ is the capacitance between the floating gate F and the control gate G of the MOSFET. The effective gate voltage $V_{Geff}$ of the MOSFET is $$V_{Geff} = V_G - V_{tho} + \Delta V_{th} \qquad (2)$$

where $V_G$ is the control gate input voltage and $V_{tho}$ is the initial threshold voltage before programming of the MOSFET. As will be shown, the amount of drain current from each transistor can be controlled by $V_{Geff}$. The output current of the synapse $I_d$ on output line 31 is a combination of the drain currents from each MOSFET branch, and follows the equation:

$$I_d = I_{dp} - I_{dn} \qquad (3)$$

where $I_{dp}$ and $I_{dn}$ are the drain currents of the P-type MOSFET 10 and the N-type MOSFET 11.

During programming mode, an analog switch 12 may be enabled to place a current pulse on the programming line 32 to reach the floating gate F of the P-type MOSFET 10, or another analog switch 13 may be enabled to place a current pulse on the programming line 33 to reach floating gate F of the N-type MOSFET 11. The switch 12 has a P-FET 42 and a N-FET 40. Similarly, switch 13 has a P-FET 46 and a N-FET 44. The FETs in both switch 12 and 13 are connected in a MOS switch configuration. The analog switch 12 may be enabled by complementary voltage levels $CONTROL_P$ and $\overline{CONTROL_P}$ on control lines 35 and 34 connected to the gates of N-FET 40 and P-FET 42, respectively. The other analog switch 13 may similarly be enabled by control lines 36 and 37, CONTROL$_N$ and $\overline{\text{CONTROL}_N}$, respectively. Each control line 34, 35, 36, and 37, is controlled externally of the cell 100, and provides independent means of selecting the desired MOSFET to receive current pulses. This allows programming lines for the same MOSFET type from multiple cells to be connected to a common line, such that a pulse on that line will reach only the MOSFET whose analog switch on its programming line is enabled, or providing simultaneous programming of multiple cells. In a network implementation each synaptic cell may have separate control lines to provide independent operation of each switch in each cell.

The CMOS inverter configuration of the circuit, provides the output current I$_d$ on output line 31, during the transition of either one or both MOSFETs from one state to another state. The bias of an active load (70 in the neuron circuit 50 of FIG. 2) connected to output line 31 of the synapse, and the control of the individual MOSFETs 10 and 11 weights allows for both inhibitory and excitatory direction of I$_d$. An inhibiting output current is present when current I$_d$ flows into the synapse on line 31, while an excitatory output current is present when current I$_d$ flows out of the synapse circuit on line 31. The level and direction of I$_d$ is controlled by adjusting the MOSFET weight values relative to the input voltage on line 30. In this manner, for a given input voltage, the voltage level at which each MOSFET will conduct drain current may be controlled. In the embodiments of the invention, the active load is located in the input of the neuron, which is connected to the output of the synaptic cell. This active load in the preferred embodiment is biased at V$_{DD}$/2. However, in other embodiments of the invention the active load's bias can be varied according to whether it is desired that current flows in or out of the active load's input. The variation range for the output current I$_d$ can be controlled by adjusting the physical width to length ratio (W/L) of the dimensions of the semiconductor material in forming each MOSFET. The following equations describe the 5 regions of operation, where an output voltage of the synapse is near V$_{DD}$/2.

The first region of operation is defined by $0<V_{in}<V_{thn}$ in which P-type MOSFET 10 is in a linear region, and the N-type MOSFET 11 is cut-off. The output current of the synapse is given by $$I_d = -B_p[(V_{in}-V_{DD}-V_{thp})(V_o-V_{DD}) - \tfrac{1}{2}(V_o-V_{DD})^2] \quad (4)$$

where V$_o$ is the voltage at the output node of the synapse, V$_{thp}$ is the threshold voltage shift and $\beta_p$ the gain of the P-type MOSFET 10, and V$_{thn}$ is the threshold voltage shift of the N-type MOSFET 11. The transconductance (g$_m$) of the synapse is this region is $$g_m = \frac{\partial I_d}{\partial V_{in}}\bigg|_{V_o=Constant} = -\beta_p(V_o-V_{DD}) \quad (5)$$

The slope of I$_d$ does not change in this region, however I$_d$ shifts as V$_{thp}$ changes.

The second region is defined by $V_{thn}<V_{in}<V_o+V_{thp}$ in which the P-type MOSFET 10 is in the linear region, and N-type MOSFET 11 is in saturation. The drain currents of the P-type and N-type MOSFETs are described by $$I_{dp} = -\beta_p[(V_{in}-V_{DD}-V_{thp})(V_o-V_{DD}) - \tfrac{1}{2}(V_o-V_{DD})^2] \quad (6)$$

$$I_{dn} = \beta_n/2[V_{in}-V_{thn}]^2 \quad (7)$$

where $\beta_n$ is the gain of the N-type MOSFET 11, and resulting output current I$_d$ is per Equation 3. The transconductance of the synapse is this region is given by $$g_m = \frac{\partial I_d}{\partial V_{in}}\bigg|_{V_o=Constant} = -\beta_p(V_o-V_{DD}) - \beta_n(V_{in}-V_{thn}) \quad (8)$$

In this region, the output current of the synapse I$_d$ is proportional to the square of $V_{in}-V_{thn}$.

The third region of operation is defined by $V_o+V_{thp}<V_{in}<V_o+V_{thn}$, where both P and N-type MOSFETs are in saturation. The saturation currents of the two MOSFETs and the transconductance of the synapse are given by $$I_{dp} = -\beta_p/2[V_{in}-V_{DD}-V_{thp}]^2 \quad (9)$$

$$I_{dn} = \beta_n/2[V_{in}-V_{thn}]^2 \quad (10)$$

$$g_m = \frac{\partial I_d}{\partial V_{in}}\bigg|_{V_o=Constant} = \quad (11)$$
$$-\beta_p(V_{in}-V_{DD}-V_{thp}) - \beta_n(V_{in}-V_{thn})$$

where resulting output current of the synapse I$_d$ is per Equation 3.

The forth region of operation is described by $V_o+V_{thn}<V_{in}<V_{DD}+V_{thp}$. The P-type MOSFET 10 is in saturation while the N-type MOSFET 11 is in a linear region. The currents of the two MOSFETs and the transconductance are $$I_{dp} = -\beta_p/2[V_{in}-V_{DD}-V_{thp}]^2 \quad (12)$$

$$I_{dn} = -\beta_n[(V_{in}-V_{thn})V_o - \tfrac{1}{2}V_o] \quad (13)$$

$$g_m = \frac{\partial I_d}{\partial V_{in}}\bigg|_{V_o=Constant} = -\beta_p(V_{in}-V_{DD}-V_{thp}) - \beta_n V_o \quad (14)$$

The fifth region of operation is defined by $V_{DD}+V_{thp}<V_{in}<V_{DD}$ in which the P-Type MOSFET 10 is cut-off, and N-type MOSFET 11 is in linear region. The output of the current of the synapse and transconductance is given by $$I_d = -\beta_n[(V_{in}-V_{thn})V_o - \tfrac{1}{2}V_o^2] \quad (15)$$

$$g_m = \frac{\partial I_d}{\partial V_{in}}\bigg|_{V_o=Constant} = -\beta_n V_o \quad (16)$$

It is noted that in the second, third, and fourth region, the output current of the synapse is proportional to the square of $V_{in}-V_{th}$. The above described five regions fully describe the operation of the synapse cell.

In operation, on the conditions that 2.5 V is the MOSFET turn ON or conductivity point, the input voltage V$_{in}$=4 V, and the threshold voltage shift for the N and P-type MOSFETs is V$_{thn}$=0 and V$_{thp}$=0, respectively, then the P-type MOSFET is OFF, and the N-type MOSFET is ON. However, if for example the weight value changes to $V_{thn}=3$ V and $V_{thp}=-0.5$ V, then the effective gate voltage of the N-type MOSFET becomes 1 V, and the P-type MOSFET becomes 4.5 V, which results in the N-type MOSFET being OFF and the P-type MOSFET being OFF. Depending on how ON or OFF a MOSFET is, determines the level of device conductivity, and thus the amount of drain current flow may be controlled. Basically, the operation of the synapse can be summarized as when the P-Type MOSFET is more ON relative to the N-type MOSFET, a certain amount of excitatory output current is generated. Alternately, when the N-type MOSFET is more ON relative to the P-type MOSFET, a certain amount of inhibitory output current is generated.

Charge canceling transistors (not shown) may be placed in the programming lines 32 and 33 between switches 12 and 13 and their respective MOSFET. Such transistors may be used to prevent distortion and maintain the condition of the programming pulse.

Figure 2:
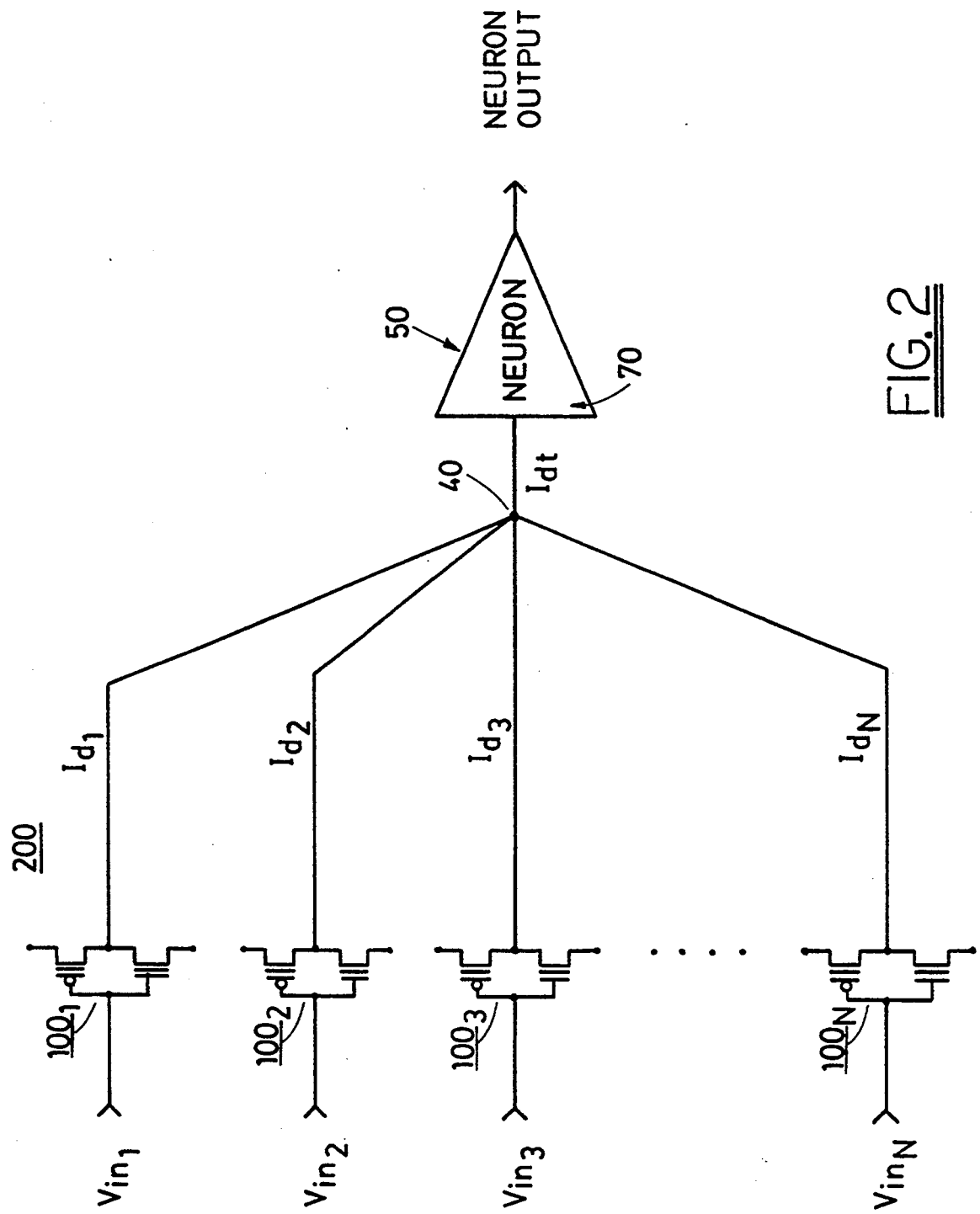
FIG. 2 is a schematic diagram of a segment of a neural network where multiple analog synapses are inputted into a neuron in accordance with the invention.

FIG. 2 shows the preferred connection of N number of synapse cells $100_1$ to $100_N$ implemented in an artificial neuron network 200. $V_{in}$, the input voltage to each cell, each represents the output voltage from a different input neuron (not shown). The output current $I_d$ from each cell is a function of the cell's $V_{in}$ and the weights of the MOSFETs in the synapse, as defined in the above equations. Output currents of N number of cells $I_{di}$ (where i=1 to N) are connected at current summing node 40, which is connected to the input of a neuron 50. The resulting neuron input current $I_{dt}$ is the summation of the output currents of each connected synapse cell per $$I_{dt} = \sum_{i=1}^{N} I_{di}.$$

An active load 70 at the input of the neuron 50 determines whether each $I_{di}$ causes inhibitory or excitatory current to the neuron, by serving either as a current sink or source to the output lines of each synapse. The neuron may be a threshold function or sigmoid function, or some other function which provides for the emission from the neuron per a given amplitude range of $I_{dt}$. Thus if $I_{dt}$ is a excitatory current, i.e. flowing into the neuron, and is of a proper amplitude for the neuron function, the neuron will subsequently emit a voltage on its output line, which may subsequently be inputted into another synapse(s) in the network.

Figure 3:
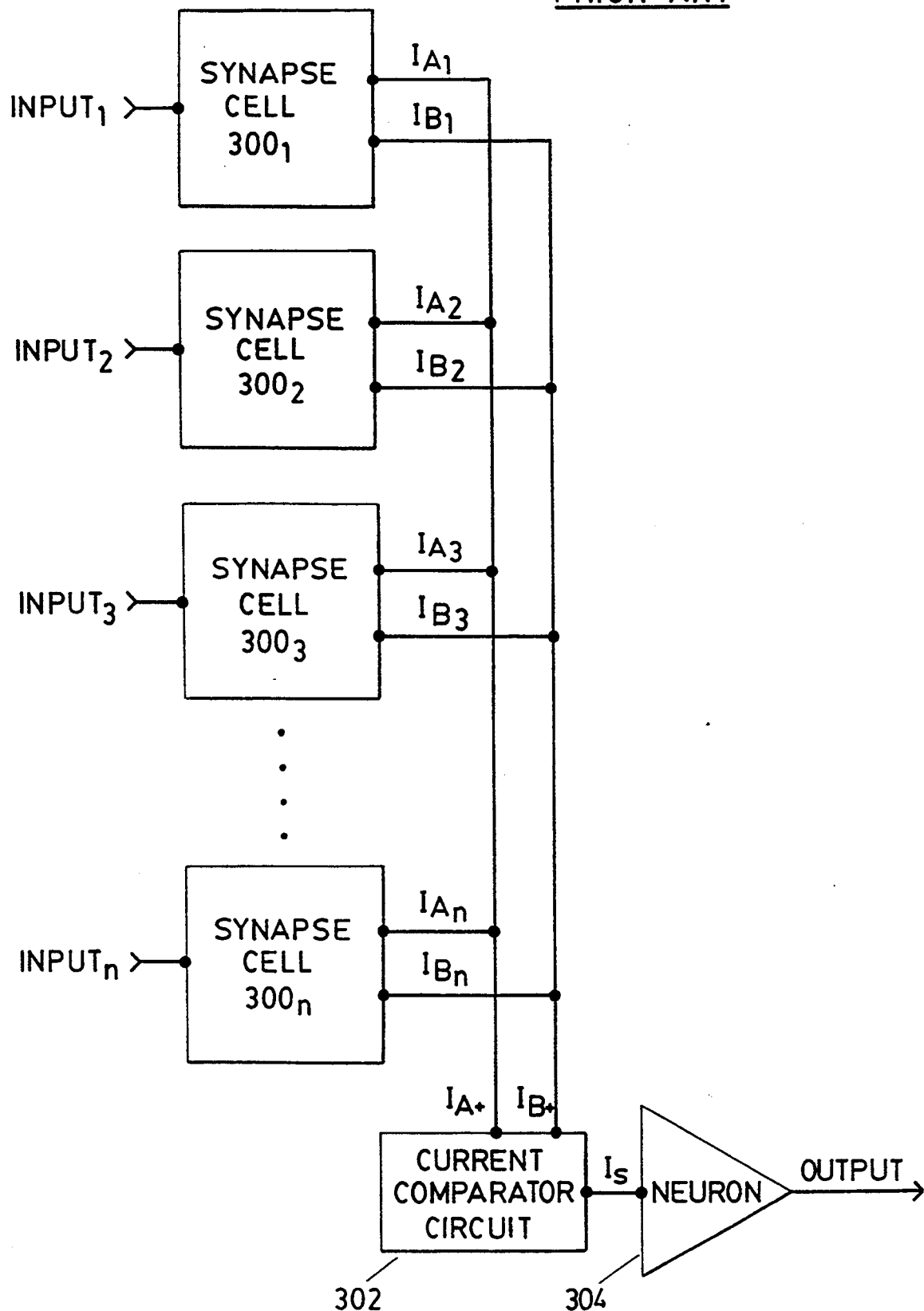
FIG. 3 is a block diagram circuit showing a synapse based on a differential output structure of the prior art.

A comparison of present invention to a synapse based on a differential output scheme will illustrate the reduction in area in using the present invention in an artificial network. FIG. 3 shows a multiple synapse circuit using a differential output configuration, where each synapse cell $300_1$ to $300_n$ has a single input, and two output lines with currents designated $I_A$ and $I_B$. The outputs of the synapses sum on two lines $I_{At}$ and $I_{Bt}$, which are inputted into a current comparator 302, where $$I_{At} = \sum_{i=1}^{n} I_{Ai} \text{ and } I_{Bt} = \sum_{i=1}^{n} I_{Bi}.$$

The current comparator sums these two currents, $I_s = I_{At} - I_{Bt}$, so as to produce a single output $I_s$ for input into a neuron 304. As FIG. 3 shows, the circuit between a neuron and N synaptic cells has $2N+1$ connections, with $6+4(N-1)$ nodes or contact points. By contrast, FIG. 2 shows that the circuit between a neuron and N synaptic cells of the present invention has $N+1$ connections, with $2+N$ nodes or contact points (for $N>1$). Thus, the present invention results in a decrease of N connections and 3N nodes or contact points. For example a 25 synapse circuit utilizing the present invention to a neuron would result in 25 fewer required connections, and 75 less contact points or nodes. Further, a comparator circuit would entirely be avoided. The result is a significant savings in chip area allowing for a denser network implementation. The significance of this savings becomes even greater as the number of neurons in a network increases.

For a fully connected artificial network of M neurons, there are M number of multi-synapse circuits, as shown in FIG. 2 or FIG. 3, prior to the input of each neuron. Each multi-synapse circuit has an input from each other neuron in the network or $M-1$ inputs, requiring $M-1$ synaptic cells. Thus in terms of the multi-synapse circuitry described above having N synapse cells, N in a fully connected network equals $M-1$. Therefore, if the difference between the multi-synapse circuit using a differential output configuration in FIG. 3 and the present invention in FIG. 2 is, as stated earlier, N connections and 3N nodes or contact points, then for a fully connected network this difference is $M-1$ connections, and $3(M-1)$ nodes. It follows then that in the total network of M number of multi-synapse circuits, one to the input of each neuron, this difference is $M(M-1)$ connections, and $3M(M-1)$ nodes. For example, in a fully connected network of 10 neurons, a differential output synapse cell configuration would require 190 connections and 380 nodes, however, using the subject synapse this is reduced to 100 connections (47% reduction), and 110 nodes (71% reduction). Thus, an artificial neural network utilizing the present analog synapse results in less IC area devoted to interconnections, and a reduction in circuit complexity.

Consider the programming means of the present invention. The use of a separate programming line to each MOSFET is advantageous to the more common programming means of setting the voltage threshold level by adjusting the input and supply voltages to a cell, and then passing a current pulse through the drain (or source) of the MOSFET. Use of the separate programming lines to a floating gate F eliminates both steps and variables to programming arising from the need to adjust the bias on multiple lines to the synapse. Long transmission lines embedded within the synapse cells are also eliminated in the synapse shown in FIG. 1. Thus, the present invention eliminates factors that can cause loss in the integrity of the programming pulse, which can negatively affect the level of the charge stored by the program pulse in the floating gate, and hence the weight value of the MOSFET. Therefore the presence of a dedicated separate programming line to each MOSFET preserves signal integrity. Further direct routing to the MOSFET reduces programming pulse distortion. Thus the weights are precisely controlled because the amount of the stored charge or weight within the MOSFETs are set accurately to desired values.

Analog switches 12 and 13 in FIG. 1 on programming lines 32 and 33, respectively, locate the switching means during programming within the analog synapse cell itself, rather than incorporating such switching means external to the cell. In this way modular construction of such cells in networks on ICs is enhanced, by removing the need to generate a switching means external to the cell. Such external switching means are used often by the prior art for programming by selecting of the bias to the circuit, and to select the drain output line to receive the pulse. In providing this internal switching means, there is a reduction in circuit complexity in using the cell in a network, and efficient utilization of IC area. A further benefit of the programming means using such switching means is that programming does not need to invoke complex selecting schemes or algorithms.

An example of the operation of the synapse is shown in Table 1 of FIG. 8 in which the input voltage is fixed at 1 V and the threshold voltage shifts for the P-type and N-type MOSFETs, $V_{thp}$ and $V_{thn}$ respectively, are varied from $-2.0$ V to 2.0 V. Note that Table 1 shows the synapse output current $I_d$ deceasing as $V_{thp}$ increase and $V_{thn}$ decreases, at a given input voltage to the synapse. Table 2 of FIG. 8 shows another example of synapse operation, in which the input voltage is varied from 0 V to 5 V with a specific synaptic weight, i.e. a fixed threshold shift of $V_{thp}=-1.0$ V and $V_{thn}=1.0$ V. Note that the resulting synapse output current $I_d$ decreases as the input voltage increases, depicting an $I_d$ curve having both inhibitory and excitatory current. These examples are meant for illustration purposes; those skilled in the art will recognize that the appropriate selection of parameters will yield the desired synapse operation.

Figure 4:
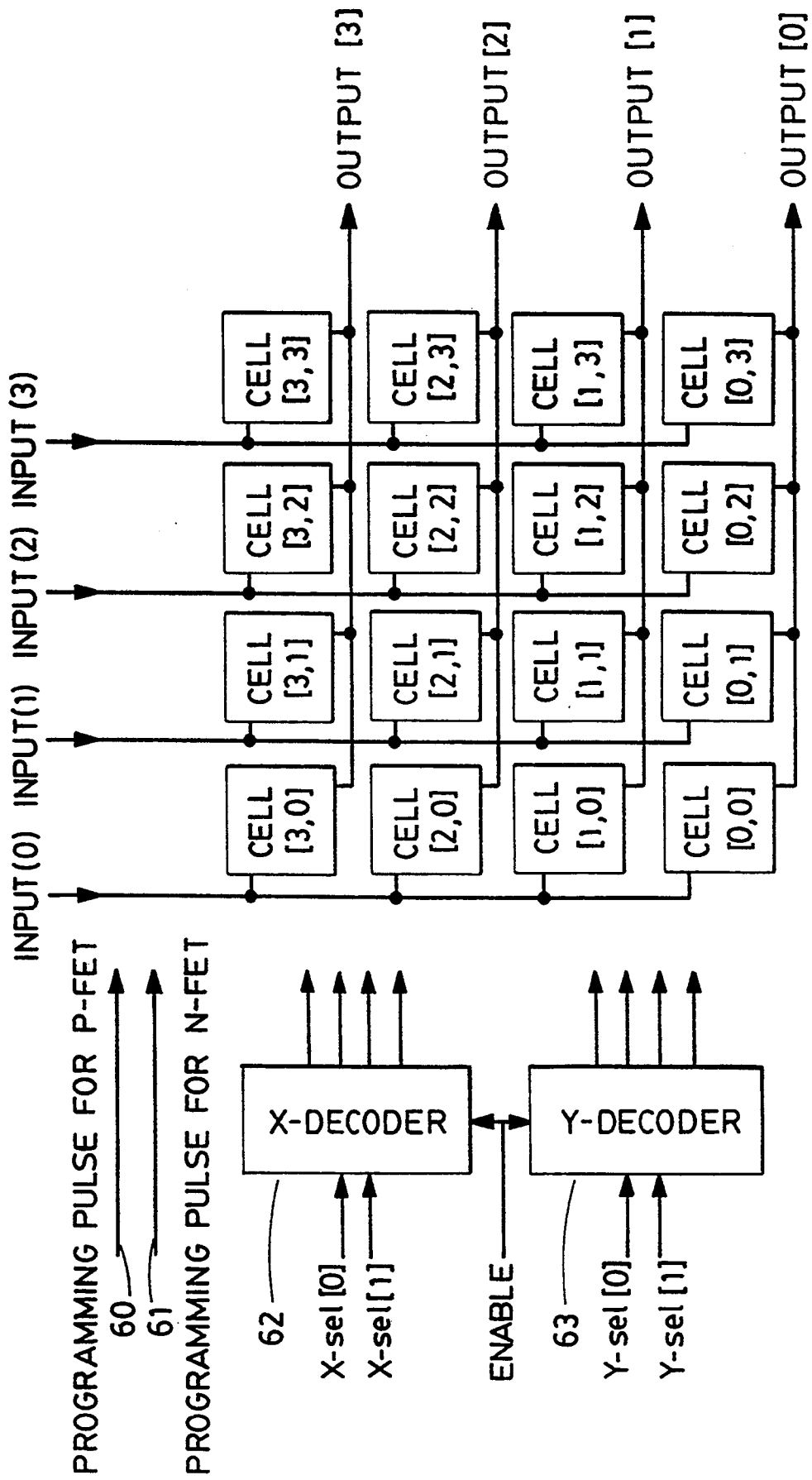
FIG. 4 is a block diagram of synaptic cells in an artificial network array in accordance with the invention.

Referring to FIG. 4, sixteen cells are arranged in a four-by-four array at x,y coordinates 0,0 to 3,3. The neurons (not shown) would exist on the output lines of each row of synapses, Output (0) to (3). Inputs (0) to (3) are routed from output of neurons (not shown). An X-decoder 62 and a Y-decoder 63 which are connected to FET switches (like 12 and 13 in FIG. 1) in each cell, provide means of selecting the appropriate MOSFET to receive a current pulse along programming lines 60 and 61 to the cells during the programming mode. The program pulse is routed to the MOSFET to be programmed by the enabling of the analog switch on the selected programming line within a synapse cell. Note that no current comparator, or complex program switching scheme is incorporated in the network.

The network can be used either as a feedforward network or a feedback network, with external feedback connections to the inputs of the array. Larger networks can be formed of such arrays by tiling the chips, and layered networks may be implemented by cascading through amplifiers which serve as hidden layers.

Figure 5:
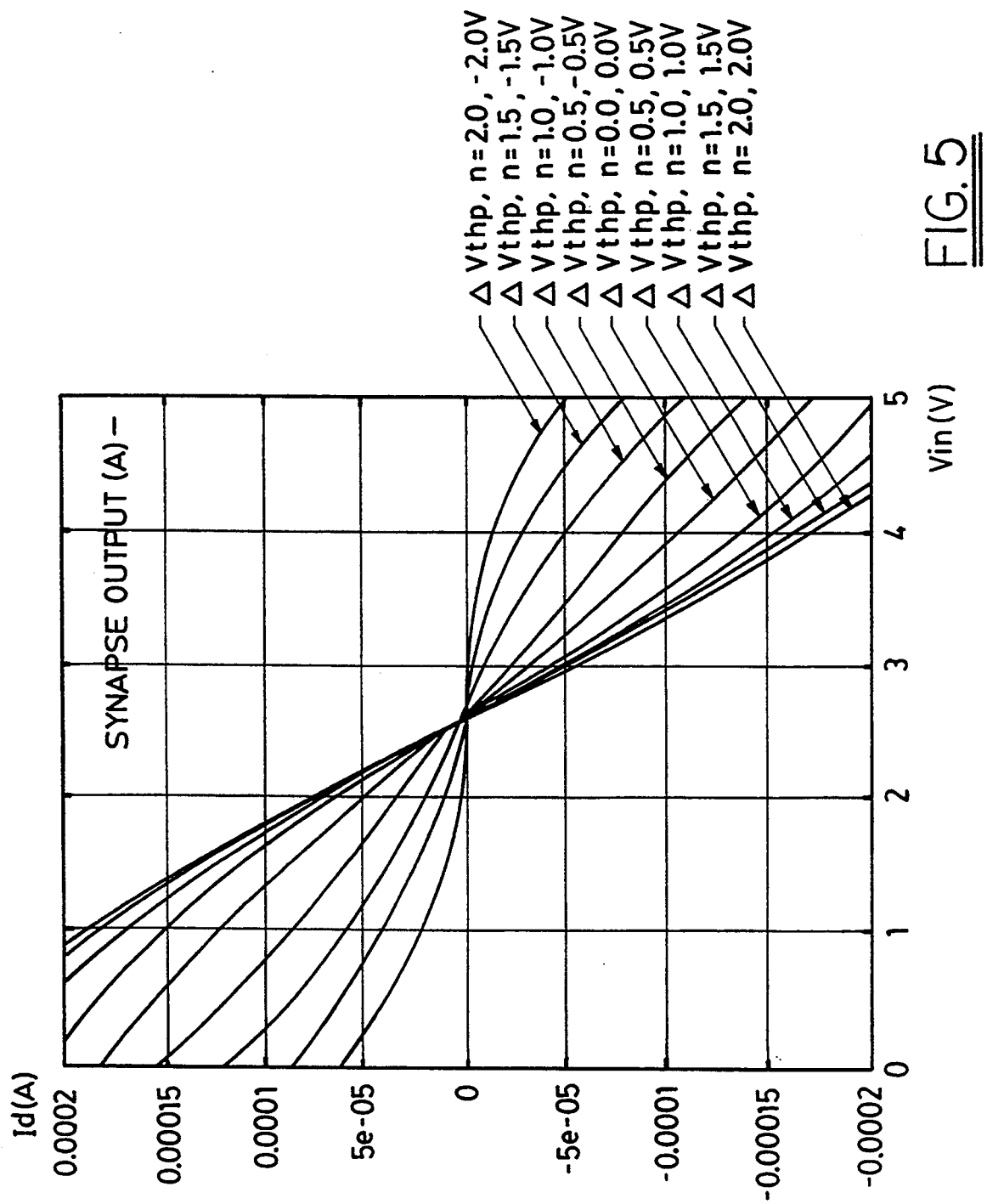
FIG. 5 is a graph of the I–V characteristic of the synaptic cell of FIG. 1 showing two quadrant multiplication in accordance with the invention.

The two quadrant multiplication of the present invention is shown in FIG. 5, where a plot of the synapse output current, $I_d$, versus the input voltage, $V_{in}$, of the synaptic operation is shown. The input voltage ranges from 0 to 5 V. The output of the synapse is connected to an active load biased at 2.5 V. The geometry of the P-type MOSFET is W/L=260 μm/2 μm and N-type MOSFET is W/L=160 μm/2 μm, where W and L is the width and length dimensions. In FIG. 5, the voltage threshold of the MOSFETs was varied from 2 V to $-2$ V, as shown by the labels on the individual curves. The $I_d$ current is excitatory (positive direction) from 0 V to 2.5 V and inhibitory (negative direction) from 2.5 V to 5 V. Note that the slope characteristic of the I-V curve may be obtained by selecting the voltage threshold or weight of the individual MOSFETs.

Figure 6:
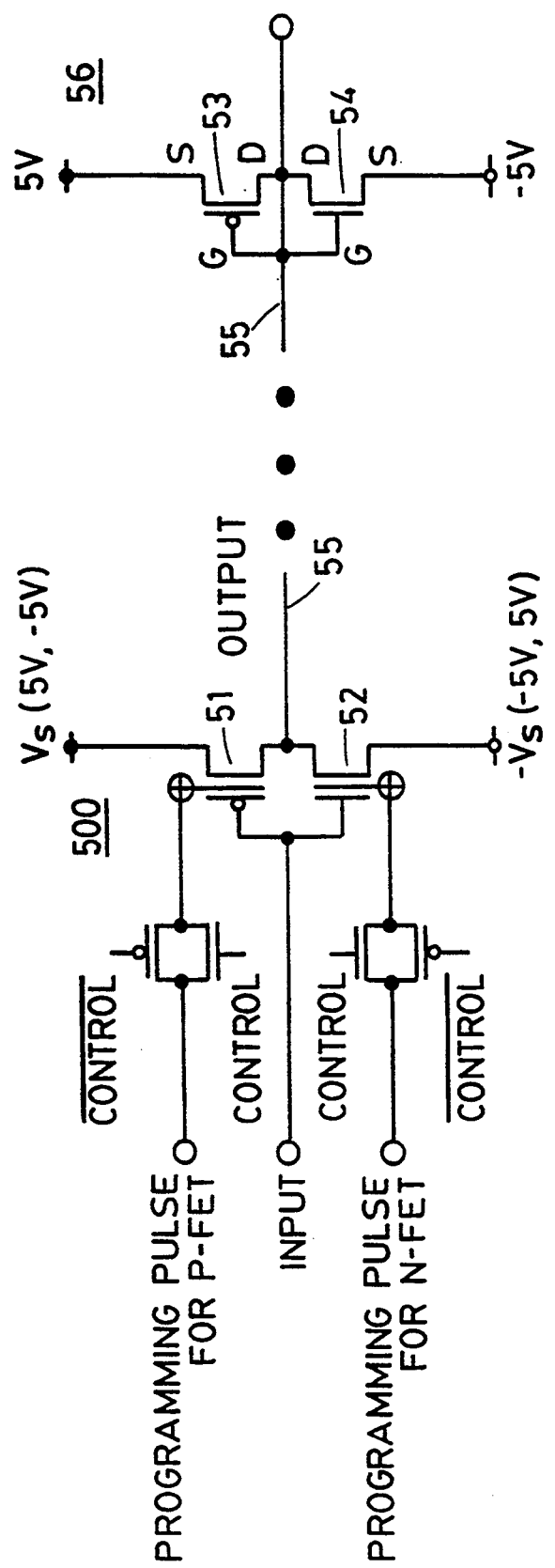
FIG. 6 is a schematic diagram of an analog synaptic cell and active load for four quadrant multiplication in accordance with another embodiment of the invention.

Referring to FIG. 6, the synapse 500 is expanded to provide four quadrant operation. In this circuit, the supply voltages to the source of the P-type MOSFET 51 and the N-type MOSFET 52, $V_s$ and $-V_s$, are either $+5$ V, and $-5$ V ($V_s>0$) or $-5$ V and 5 V ($V_s<0$). Also, an active load 56 in the neuron has a P-type 53 and N-type 54 MOSFET (non-tunneling), with the source of the P-type MOSFET set to 5 V, and the source of the N-type MOSFET set to $-5$ V. Drains and gates of each MOSFET in the active load 56 are connected to the current summing line 55 from the synapse. The node voltage of current summing line 55 is maintained near 0 V by matching the P and N type MOSFETs in the active load. The active load acts as either a current sink or a source, thus the output current $I_d$ may flow either in an excitatory or in inhibitory direction.

Where the $V_s>0$, and the output of the synapse is 0 V, the first order drain currents of P-type MOSFET 51 and N-type MOSFET 52 in the synapse are

|  | Equation | Voltage Condition | MOSFET region |  |
|---|---|---|---|---|
| $I_{dn} =$ | 0 | $V_{in} - V_{thn} < -V_s$ | cut-off |  |
|  | $\beta_n V_s(V_{in} - V_{thn} + 1/2V_s)$ | $-V_s < V_{in} - V_{thn} < 0$ | linear | (17) |
|  | $\beta_n/2(V_{in} + V_s - V_{thn})^2$ | $V_{in} > V_{thn}$ | saturation |  |
| $I_{dp} =$ | 0 | $V_{in} - V_{thp} > V_s$ | cut-off |  |
|  | $-\beta_p V(V_{in} - V_{thp} - 1/2V_s)$ | $0 < V_{in} + V_{thp} < V_s$ | linear | (18) |
|  | $\beta_p/2(V_{in} - V_s + V_{thp})^2$ | $V_{in} + V_{thp} < 0$ | saturation |  |

Where $V_s<0$, the equation defining the operation of the synapse are

|  | Equation | Voltage Condition | MOSFET region |  |
|---|---|---|---|---|
| $I_{dn} =$ | 0 | $V_{in} - V_{thn} < 0$ | cut-off |  |
|  | $\beta_n V_s(V_{in} - V_{thn} + 1/2V_s)$ | $V_{in} - V_{thn} > -V_s$ | linear | (19) |
|  | $-\beta_{thn}/2(V_{in} - V_{thn})2$ | $V_{in} - V_{thn} < -V_s$ | saturation |  |
| $I_{dp} =$ | 0 | $V_{in} + V_{thp} > 0$ | cut-off |  |
|  | $\beta_p V_s(V_{in} + V_{thp} - 1/2V_s)$ | $V_{in} + V_{thp} < V_s$ | linear | (20) |
|  | $\beta_p/2(V_{in} - V_s - V_{thp})^2$ | $V_s < V_{in} + V_{thp}$ | saturation |  | where output current $I_d$ is per Equation 3.

The equations in (17) and (20) show that the polarity of the slope of the output current is determined by the polarity of $V_s$, and effective threshold voltage $$V_{thp} = V_{thpo} + V_{thp} \qquad (21)$$

$$V_{thn} = V_{thno} + V_{thn} \qquad (22)$$

controls the degree of the slope, where $V_{thpo}$ and $V_{thno}$ are the inherent gate threshold voltage of the P and N-type MOSFETs, respectively.

Figure 7:
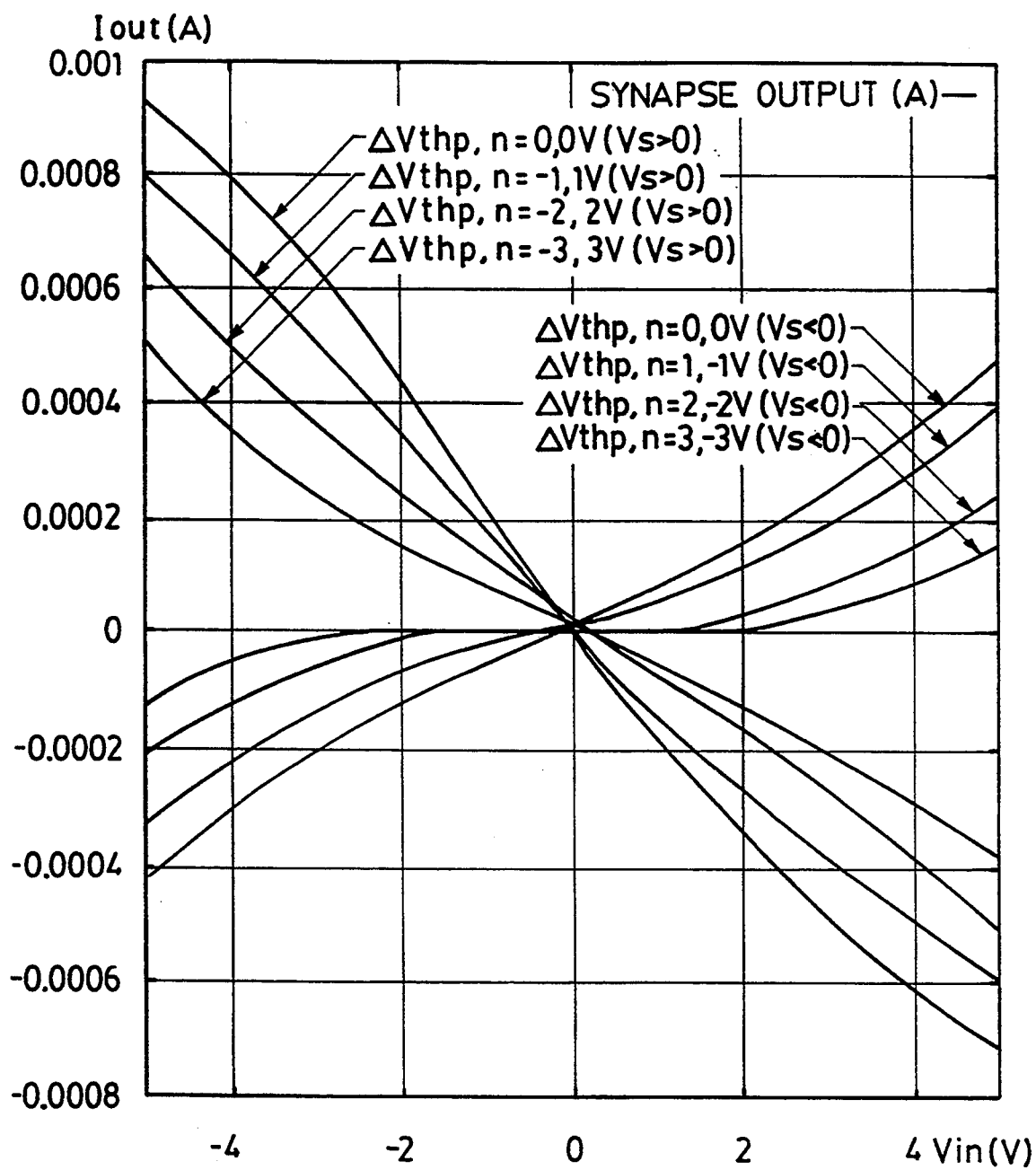
FIG. 7 is a graph of the I–V characteristic showing four quadrant multiplication of the cell shown in FIG. 6.

For both $V_s>0$ and $V_s<0$, the P-type and N-type MOSFETs of the synapse operate in one of three modes and thus yield near linear weight functions over four quadrants, as shown in FIG. 7. FIG. 7 shows the $I_d(I_{out}(A))$ versus $V_{in}(V_{in}(V))$, where the voltage shift of the transistor is varied from 3 V to $-3$ V. The adjustment of $V_s$ from greater than or less than 0, in this case 5 V and $-5$ V, determines the quadrant of synaptic operation, while the weights of the MOSFETs can be adjusted to obtain the desired characteristic function. In FIG. 7 the P-type MOSFET is (W/L) 10 $\mu$m/6 $\mu$m, and the N-type MOSFET is (W/L) 4 $\mu$m/6 $\mu$m, where W is the width and L is the length of the formed semiconductor material. The active load P-FET is (W/L) 260 $\mu$m/2 $\mu$m, and the N-FET is (W/L) 160 $\mu$m/2 $\mu$m. The degree of the slope according to various threshold voltages demonstrates the four quadrant operation of the synapse. Thus, the small architecture and minimum interconnection of the synapse allows for increased density on a VLSI chip circuitry by efficient utilization of chip area, with the additional capability of efficient four quadrant synaptic operation.

From the foregoing description, it will be apparent that there has been provided improved neural networks containing programmable analog synapses which have reduced area constraints in implementation on an integrated circuit, improved programming means, and the capability of expansion from two to four quadrant operation. Variations and modifications in the herein described analog synapse, within the scope of the invention, will undoubtedly suggest themselves to those skilled in the art. Accordingly, the foregoing description should be taken as illustrative and not in a limiting sense.

We claim:

1. In an artificial neural-network composed of a plurality of analog synapses having programmable synaptic weights and at least one neuron, where said analog synapses each have a signal input line and an output line, said output line being connected to said neuron, to provide an output which is a function of the input signal on said input line and the synaptic weights presented by said synapses, characterized in that each of said plurality of synapses comprises two complementary floating gate MOSFETs in an inverter structure having an output connected to said output line, the gates of said MOSFETs being connected to said input line, each said MOSFET having separate means for setting a weight value therein, and means for transmitting a programming pulse to said MOSFETs floating gate for programming each weight of said MOSFETs.

2. The invention according to claim 1 where one of said two MOSFETs is of P-type and the other of said MOSFETs is of N-type.

3. The invention according to claim 1 wherein said input signal line is connected in common to the gates of said MOSFETs, and said MOSFETs have drains which are connected in common to said output line, and means for applying voltage to the sources of said MOSFETs.

4. The invention according to claim 1 wherein said MOSFETs have means for tunneling injection of charge into their floating gates, and programming means comprise means for applying signals of selected amplitude and duration to programming lines to floating gates of said MOSFETs to operate said charge injection means whereby the storage of said charge shifts the voltage thresholds of the MOSFETs, said stored charge providing the synaptic weights.

5. The invention according to claim 3 wherein the output line of each of said plurality of synapses are connected to a current summing node of said neuron at an input thereof.

6. The invention according to claim 1, wherein said network has a plurality of neurons fully connected, by connections of each said neurons to each other, interconnection points between said synapses and said neurons providing nodes, and wherein the number of neurons is M and the number of said synapses is M(M−1), the number of connections between said synapses and said neurons in said network is $M^2$, and the number of nodes is M(M+1).

7. The invention according to claim 5 wherein said neuron provides an active load in the input of said neuron, and means for biasing said load to provide both inhibitory and excitatory output current on said output line from each of said synapses.

8. The invention according to claim 7 wherein said functions describes the operating regions of said synapse as defined by the input voltage, the weight of each said MOSFET, and the voltage at the output of the synapse, and by the voltage bias at the sources of said MOSFETs to provide either two or four quadrant operating modes.

9. The invention according to claim 8, wherein the sources of said MOSFETs in the synapses are biased at polarities opposite to each other, and the output of said synapse is connected to an active load in the input of said neuron, said active load comprises two complementary FETs, one of P-type and one of N-type, having gates and drains connected to the output of said synapse, and the sources of each said FETs are biased at opposite polarities, thereby providing the four quadrant operating mode of said synapse through said function.

10. A synapse connectable to a neuron in an artifical neural network which comprises a pair of MOSFETs of opposite conductivity type, each having source, drain, and gate electrodes, an operating voltage supply, a signal input connected in common to said gates, and said drains being connected in common to provide an output connectable to said neuron, said supply being connected across the said sources to connect said MOSFETs in an inverter configuration wherein said MOSFETs are P and N type, floating gate MOSFETs, with tunneling injection, and floating gate electrodes, and wherein programming lines are connected to said floating gate electrodes for carrying programming pulses.

11. The synapse according to claim 10, further comprises analog switches in said programming lines and, means for enabling said switches to apply said programming pulses to said floating gate electrodes.

* * * * *